United States Patent [19]

Majerus et al.

[11] Patent Number: 4,946,639
[45] Date of Patent: Aug. 7, 1990

[54] METHOD FOR INJECTION MOLDING ELONGATED BODIES

[75] Inventors: Norbert Majerus; Harold E. Mills; John S. Rambacher, all of Akron, Ohio

[73] Assignee: The Goodyear Tire & Rubber Company, Akron, Ohio

[21] Appl. No.: 294,407

[22] Filed: Jan. 9, 1989

Related U.S. Application Data

[62] Division of Ser. No. 201,769, Jun. 2, 1988, Pat. No. 4,818,203.

[51] Int. Cl.⁵ .............................................. B29C 45/14
[52] U.S. Cl. ...................................... 264/308; 264/325; 264/327; 264/328.8; 264/328.11; 264/328.16; 264/328.2
[58] Field of Search ............... 264/308, 326, 167, 320, 264/328.1, 325, 328.2, 327, 328.3, 328.8, 328.11, 328.16; 425/115, 543, 547, 572, 574, 577, 581; 156/125, 137, 140

[56] References Cited

U.S. PATENT DOCUMENTS

| | | | |
|---|---|---|---|
| 2,710,425 | 5/1951 | Rhodes | 425/34.1 |
| 2,897,540 | 8/1959 | Rhodes | 425/582 |
| 3,992,503 | 11/1976 | Henfrey et al. | 264/167 |
| 4,185,065 | 1/1980 | Knipp et al. | 264/254 |
| 4,230,649 | 10/1980 | Bohm et al. | 264/22 |
| 4,588,365 | 5/1986 | Holzschuh | 264/328.8 |

FOREIGN PATENT DOCUMENTS

0176945 4/1986 European Pat. Off. .

Primary Examiner—Jill L. Heitbrink
Attorney, Agent, or Firm—T. P. Lewandowski; Frederick K. Lacher

[57] ABSTRACT

A tire tread (74,76,194) is injection molded by increments in a mold cavity (56,58,119,224,262) having an open end (110,272) closed by a trailing end (116) of a cured section (114,228). A temperature moderating closed end (109,207,268) prevents complete curing of a trailing portion (116) of the cured section (114,228) while the rest of the section is cured. The mold (14,16,90,188,236) is opened so that the cured section (114,228) may be shifted to a position where the trailing portion (116) is clamped in the open end (110,272) of the mold cavity (56,58,119,224,262). A second section (118,228,264) is injection molded in the cavity (56,58,119,224,262) and the partially cured trailing portion (126) of the cured section (114,228,264) is cured and adhered to the leading portion (130) of the second section (114,228,264) as the second section is cured. This process may then be repeated for later sections to provide a desired length of cured tire tread stock (74,194,264). The mold (14,16,90,118,188,236) may have substantially flat molding surfaces (108) or longitudinally and curved molding surfaces (192,210,244). Mold segments (204,206,208,256,258,260) for a circumferentially curved mold cavity (224,262) may also be provided.

14 Claims, 10 Drawing Sheets

METHOD FOR INJECTION MOLDING ELONGATED BODIES

RELATED PATENT APPLICATIONS

This is a division of application "Ser. No. 201,769, filed June 2, 1988 which has issued as U.S. Pat. No. 4,818,203 on Apr. 4, 1989, and relates to injection molding elongated bodies and especially continuous lengths of flat or circumferentially and longitudinally curved precured tire treads. These lengths of tread can be made by increments and coiled into rolls for storage and shipping to the place of use. The tread is cut to the desired length at the time of use for adherence to a new tire casing or to a tire to be retreaded by a suitable adhesive.

U.S. Pat. application Ser. No. 295,988 entitled "System for Injection Molding Tire Treads" filed Jan. 12, 1989 which is assigned to the assignee of this Patent Appication, is also directed to the injection molding of continuous tire treads and is being filed at the same time this application is being filed.

BACKGROUND OF THE INVENTION

Heretofore, it has been proposed to make a continuous tread by feeding a strip of unvulcanized rubber onto a rotating cylinder and then enclosing the strip with mold segments rotating with the cylinder and radially movable into engagement with the cylinder. The tread is cured by compression molding and then removed from the cylinder as the mold segments are moved radially away from the cylinder. This process is not adaptable for injection molding where the tread must be formed and cured by increments and therefore there must be provision made to adhere the previously cured section to the section being injected and cured.

Continuous tire treads have also been made by passing an extruded rubber strip between cooperating mold segments carried by respective endless belts which apply suitable temperatures and pressure to the strip to produce the surface designs. The molded, uncured rubber strip is then removed from the molds and cured by applying radiation or heat. Here again, the process is not adaptable for injection molding.

SUMMARY OF THE INVENTION

The present invention provides an apparatus which is adaptable for injection molding and provides for the adhesion of the adjacent sections. In accordance with the invention, a section of a tire tread is injection molded in a mold cavity of a mold. The mold has an open end closed by a trailing end of a cured section. A temperature moderating closed end prevents complete curing of a trailing portion of the injected section while the rest of the section is being cured. After the section is cured, the mold may be opened and the section shifted to a position outside the mold.

The trailing portion of the cured section is clamped in the open end of the mold cavity to form a barrier for injection molding of the next section. During the injection molding of the next section, the trailing portion of the cured section is completely cured and adhered to the leading portion of the next section. This process may be repeated indefinitely providing any length of tread stock for storing or shipping. Multiple mold cavities may also be provided with runners and gates communicating fluid molding material to the mold cavities at spaced-apart locations along the sides of each of the mold cavities. The mold cavities may also be curved longitudinally and circumferentially to conform with the shape of the tire on which the tread is to be applied. Individually movable mold segments may be provided for forming the curved tread and the segments may be operated by individual piston and cylinder assemblies for selective retraction of the segments after curing of a curved tread section.

In accordance with an aspect of the invention, there is provided a method of injection molding a continuous elongated body of curable fluid molding material by increments in a mold with a mold cavity having a temperature moderating closed end and an open end wherein the distance between the closed end and the open end is less than the length of the elongated body comprising:

(a) injecting a curable fluid molding material into the mold cavity forming a first section of the elongated body in a first position having a trailing portion abutting the closed end;

(b) heating the fluid molding material after injection to cure the first section;

(c) limiting the heating of the trailing portion of the first section at the closed end of the mold cavity to prevent full curing of the trailing portion.

(d) opening the mold;

(e) shifting the first section longitudinally from the first position in the mold cavity to a second position with the trailing portion of the first section in the open end of the cavity and the remainder of the first section outside of the mold;

(f) closing the mold to enclose the mold cavity and clamp the trailing portion of the first section;

(g) injecting a curable fluid molding material into the mold cavity forming a second section of the elongated body with a leading portion of the second section abutting the trailing portion of the first section and a trailing portion of the second section abutting the closed end of the mold cavity;

(h) heating the fluid molding material after injection of the second section and the trailing portion of the first section to cure the second section and adhere the trailing portion of the first section to the leading portion of the second section; and (i) opening the mold and removing the trailing portion of the first section and the second section of the elongated body from the mold cavity.

In accordance with another aspect of the invention, there is provided an apparatus for injection molding of a continuous elongated body of curable fluid molding material by increments comprising a mold, a mold cavity in the mold, a temperature moderating closed end of the mold cavity, an open end of the mold cavity spaced from the closed end a distance less than the length of the elongated body, means for injecting a curable fluid molding material into the mold cavity to form a first section of the elongated body in a first position with a trailing portion abutting the closed end, means for heating the injected fluid molding material to cure the first section, temperature moderating means for limiting the heating of the trailing portion of the first section at the closed end to prevent full curing of the trailing portion of the first section, means for opening the mold to permit shifting of the first section longitudinally from the first position in the mold cavity to a second position with the trailing portion of the first section at the open end of the mold cavity and the remainder of the first section outside of the mold, the means for closing the mold being operative to enclose the mold cavity and clamp the trailing portion of the first section, the means for injecting the curable fluid molding material being operative to form a second section of the elongated body with a leading portion of the second section abutting the trailing portion of the first section and a trailing portion of the second section abutting the closed end of the mold cavity, the means for heating being operative to heat the injected fluid molding material of the second section and the trailing portion of the first section to cure the second section and adhere the trailing portion of the first section to the leading portion of the second section, and the opening means being operative to open the mold for removing the trailing portion of the first section and the second section of the elongated body from the mold cavity.

To acquaint persons skilled in the arts most closely related to the present invention, certain preferred embodiments thereof illustrating the best modes now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

Figure 1:
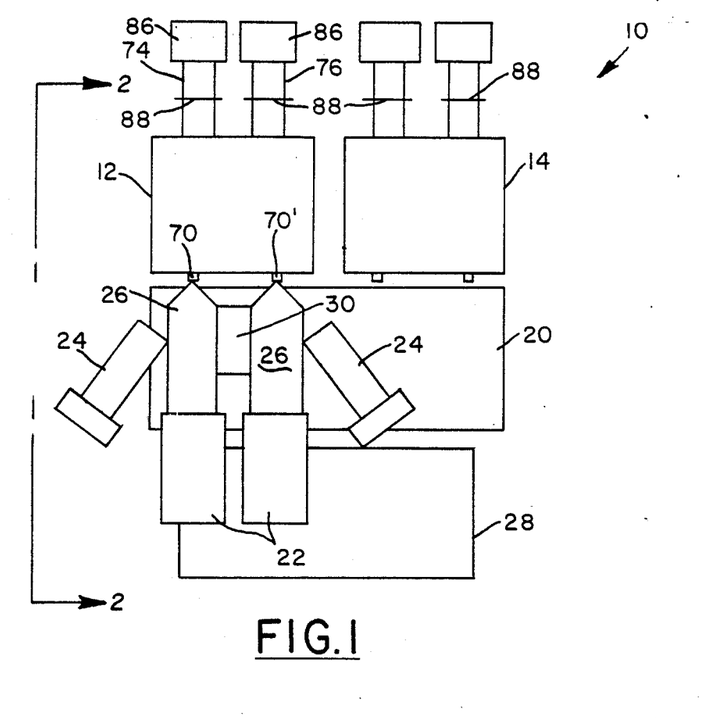
FIG. 1 is a schematic plan view of cold runner apparatus embodying this invention positioned adjacent two injection molding machines for serving two sets of flat tread molds.
Figure 2:
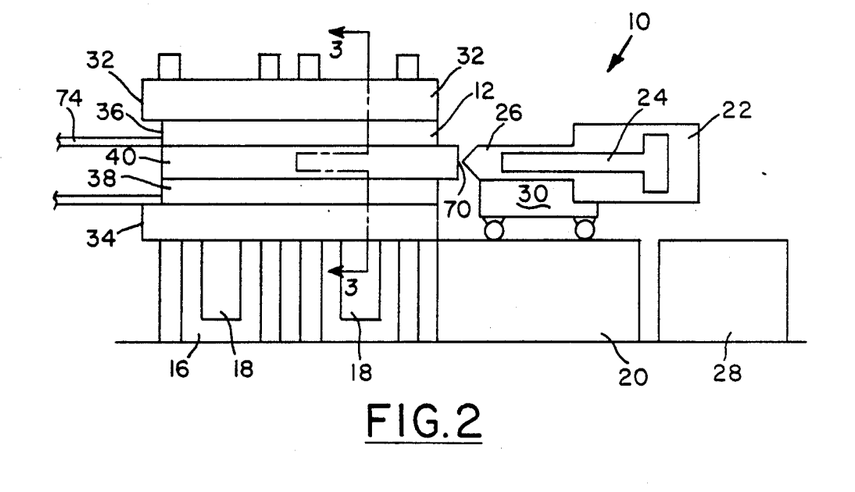
FIG. 2 is a schematic end view of the apparatus shown in FIG. 1 taken along line 2—2 in FIG. 1.

Referring to FIGS. 1 and 2, a tread molding apparatus 10 in which a first four-cavity mold 12 is positioned alongside a second four-cavity mold 14. Each of the molds 12 and 14 are mounted in a press 16 having clamp cylinders 18. A frame 20 positioned alongside the molds 12 and 14 supports injection molding machines 22,22 of a type well known in the art for injecting a curable, fluid molding material such as rubber into the molds 12 and 14. The injection molding machines 22,22 may have extruders 24,24 feeding rams 26,26. Feedstock such as strip rubber may be stored in a feedbox 28 for supplying the extruders 24,24. The injection molding machines 22,22 may be mounted on a movable support 30 for positioning the injection molding machines on the frame 20 to service the mold 12 in one position and the mold 14 in another position. It is understood that one injection molding machine 22 or more than two machines may be used to inject the fluid molding material into the molds 12 and 14.

Figure 3:
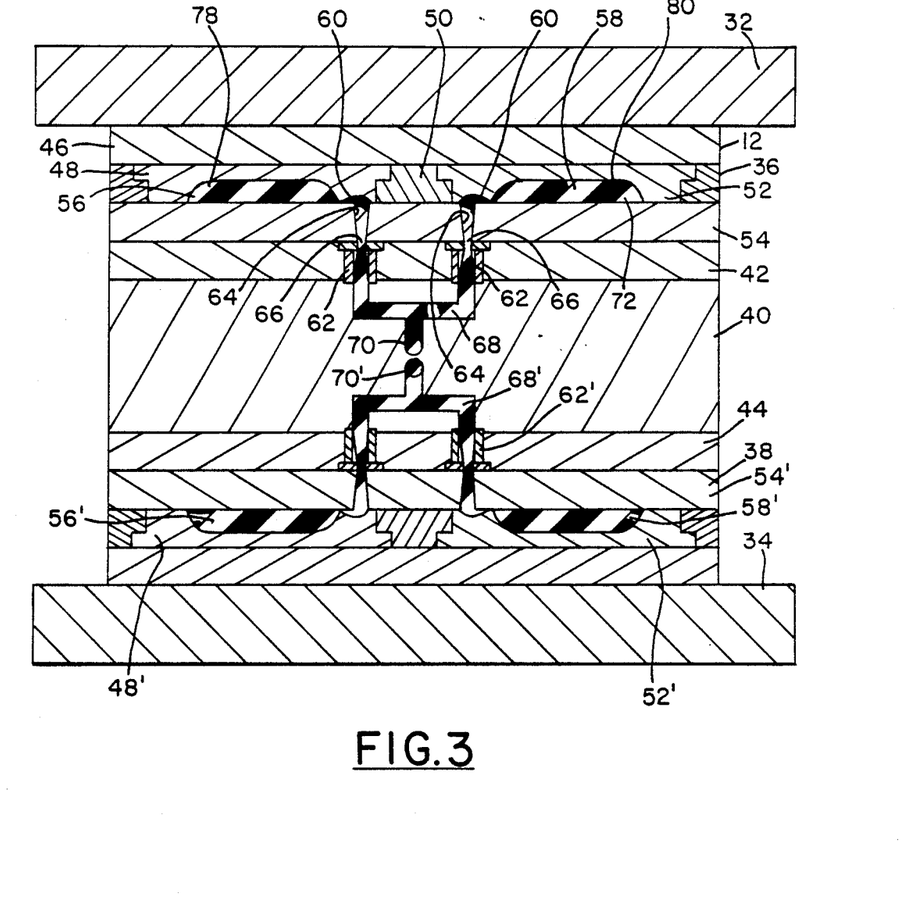
FIG. 3 is an enlarged transverse sectional view taken along line 3—3 in FIG. 2 of one of the double molds showing the cold runners and gates.

Referring to FIGS. 2 and 3, the mold 12, which may be identical with the mold 14, is mounted between a top platen 32 and a bottom platen 34 of the press 16. The mold 12 has an upper mold 36 and a lower mold 38 which may be separated by a cold runner block 40 and heated plates 42 and 44.

The upper mold 36 will be described next and has the same construction as the lower mold 38 except the lower mold is inverted. The upper mold 36 has a top mold section 46 mounted on the top platen 32 and supporting a first tread segment assembly 48 on the left side of a center member 50 and supporting a second tread segment assembly 52 on the right side of the center member as viewed in FIG. 3. The upper mold 36 has a bottom mold section 54 attached to the heated plate 42 and enclosing a first mold cavity 56 in the first tread segment assembly 48 and a second mold cavity 58 in the second tread segment assembly 52.

Gates 60 are provided along at least one side of the first mold cavity 56 and second mold cavity 58 and may be connected to cooled nozzles 62 in the heated plate 42 by tapered sprues 64 having breakoff points 66 at the ends of the cooled nozzle 62. Cold runners 68 are connected to the cooled nozzles 62 and lead to a cold runner inlet 70 for engagement by one of the injection molding machines 22,22. The cold runners 68 are preferably positioned so that the fluid molding material or injected rubber 72 will travel the same distance from the cold runner inlet 70 to each of the gates 60. In this way, the first mold cavity 56 and second mold cavity 58 will be filled providing treads 74 and 76 having first tread sections 78 and 80 of the continuous elongated body of curable material by means of a process and apparatus to be described later in the specification. The first tread sections 78 and 80 are formed in the first mold cavity 56 and second mold cavity 58 whereupon the press 16 is opened and the first tread sections moved out of the mold cavities and the leading ends wrapped around rollers 86 as shown in FIG. 1. Second tread sections (not shown) of the treads 74 and 76 are then formed in the first fourcavity mold 12 and adhered to the first tread sections 78 and 80 in a manner to be described later. The press 16 is then opened and the first tread sections 78 and 80, along with the second sections, wrapped around the rollers 86. This procedure may be continued until the desired lengths of the treads 74 and 76 are wrapped on the rollers 86,86 at which time cutters 88,88 positioned between the mold 12 and the rollers may be actuated to cut the treads to the desired length.

As shown in FIGS. 1, 2 and 3, the injection molding machines 22,22 may have two rams 26,26, one of which is positioned for engagement with the cold runner inlet 70 in communication with the runners 68 for the upper mold 36. The other ram 26 is in engagement with the cold runner inlet 70' in communication with the runners 68' for conveying the uncured rubber into the mold cavities 56' and 58' of the lower mold 38. The cold runner inlets 70 and 70' may also be positioned in the cold runner block 40 for communication with injection molding machines 22,22 located above or below the molds 36 and 38.

During the time when the first four-cavity mold 12 is opened to shift the first tread sections 78 and 80 out of the mold cavities 56 and 58, the injection molding machines 22,22 with the rams 26,26 and extruders 24,24 may be moved on the movable support 30 to a position alongside the second fourcavity mold 14 and uncured rubber may be injected into that mold in a manner similar to that described above for the first four-cavity mold. Alternatively, separate injection molding machines 22,22 may be provided to inject the uncured rubber into the second four-cavity mold 14.

Vacuum passages (not shown) may be provided in the upper mold 36 and lower mold 38 in communication with the mold cavities 56 and 58 of the upper mold and the mold cavities 56' and 58' of the lower mold. Also a source of vacuum (not shown) may be in communication with the vacuum passages to increase the rate of filling the mold cavities 56,56' and 58,58' and prevent air containment in the treads.

The cold runner block 40 and cooled nozzles 62 may have cooling passages for a suitable cooling medium such as water which may be in a range of 160° F. to 260° F. (71° C. to 127° C.), preferably around 220° F. (104° C.) at 80 psi (5.62 kg/cm²).

Heating of the upper mold 36 and lower mold 38 may be provided by heating passages in communication with a suitable heating means such as steam. The injected rubber 72 is heated to a relatively high temperature in the range of from 300° F. to 400° F. (149° C. to 204° C.) and preferably to around 340° F. (171° C.).

The curing time of the first tread sections 78 and 80 and the other tread sections may be from 1½ to 8 minutes depending on the curing properties of the injected rubber 72, the temperature of the upper mold 36 and the lower mold 38, and the thickness of the tread section which may be in a range of from 12/32 to 1 inch (0.95 to 2.54 cm). The clamping force exerted is sufficient to maintain a cavity pressure of from 2000 to 10,000 psi (140.62 to 703.08 kg/cm²).

Figure 4:
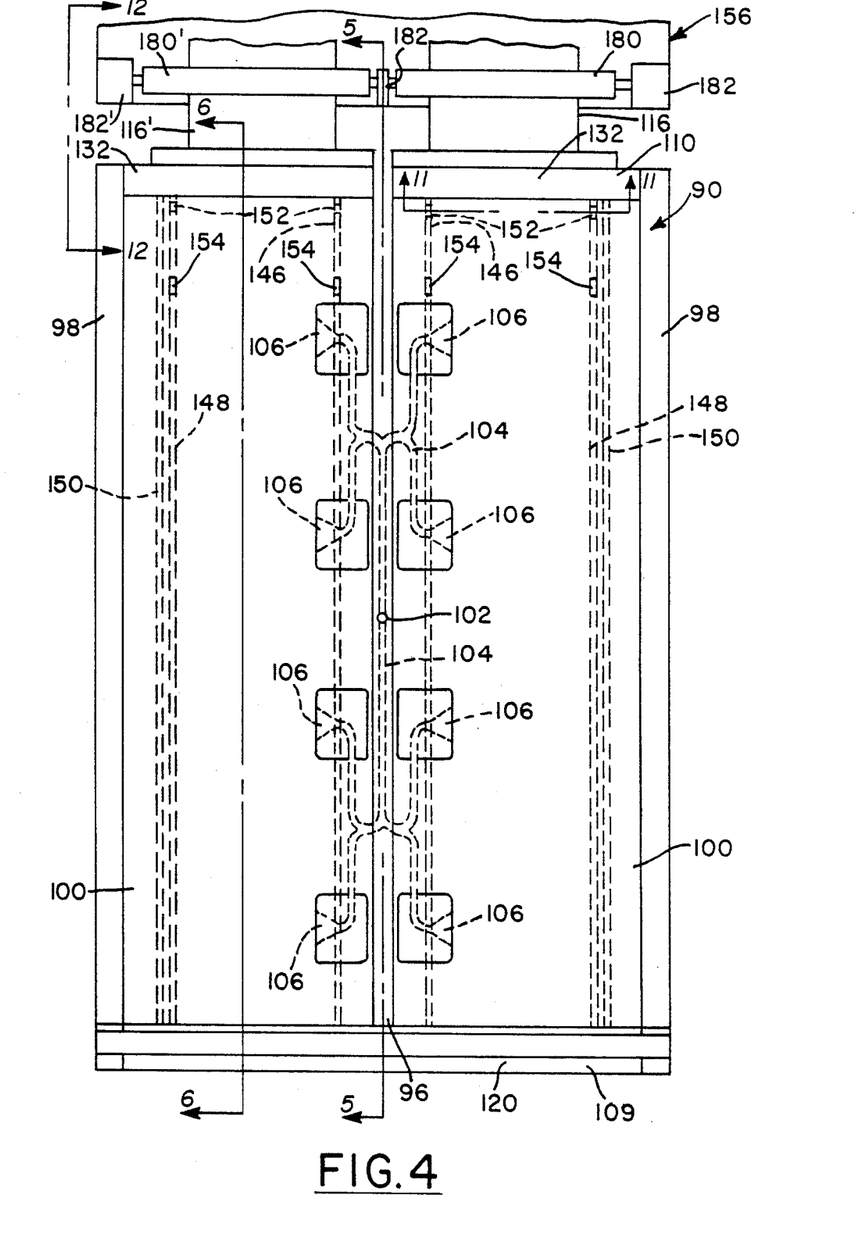
FIG. 4 is an enlarged plan view of a double hot mold showing a modification of the invention with the grooves, runners and gates being shown in dotted lines.
Figure 5:
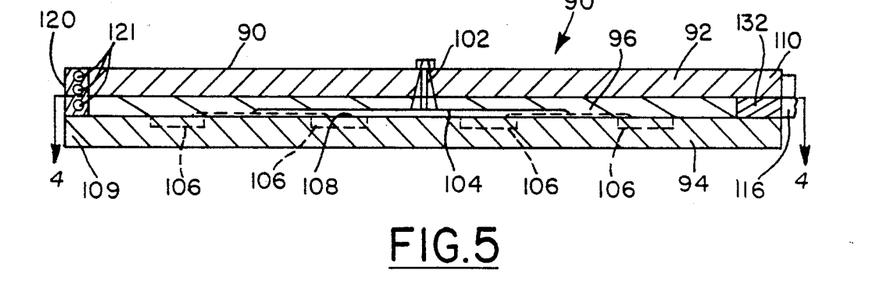
FIG. 5 is a longitudinal sectional view taken along line 5—5 in FIG. 4 showing the runners and gates in dotted lines.

Referring to FIGS. 4 through 13, a modified two-cavity mold 90 embodying the invention is shown. The mold 90 has an upper mold section 92 and a lower mold section 94 separated by a center rail 96 and side rails 98 for holding tread mold segments 100 in position. As shown in FIGS. 4 and 5, a central runner 102 extending through the upper mold section 92 is in communication with runner grooves 104 in the surface of the center rail 96 for communicating the injected rubber 72 to gates 106 in an upper surface 108 of the lower mold section 94.

The mold 90 has a closed end 109 and an open end 110. As shown in FIGS. 4 and 5, no barrier member is provided at the open end 110 for molding a first section 114 of tread. Some of the rubber 72 of the first section 114 is injected through the open end 110 forming a partially foamed plug which is cut off later. Thereafter a trailing portion 116 of the first section will close the open end 110 as shown schematically in FIG. 6.

Figure 6:
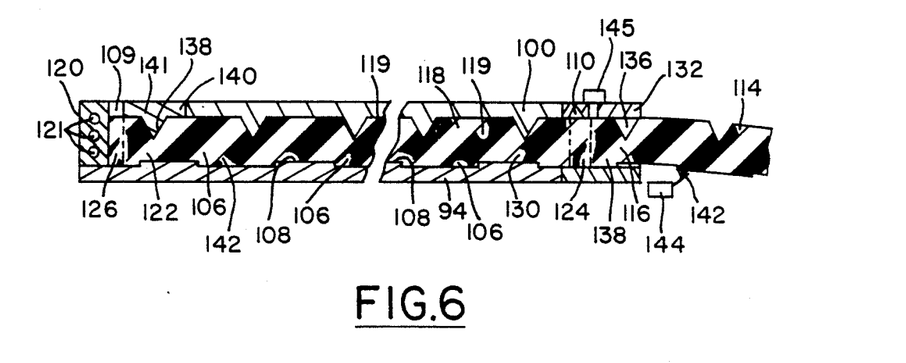
FIG. 6 is a schematic sectional view taken along line 6—6 in FIG. 4 with the first and second sections of the tread in the mold, and parts being broken away.

The mold 90 is heated by steam or other suitable heating means for curing the first section 114 of tread and a second section 118 of tread after injection into mold cavities 119 of the tread mold segments 100 as shown in FIG. 6. The injected rubber 72 may be heated to a relatively high temperature in the range of 300° F. to 400° F. (149° C. to 204° C.) and preferably to around 340° F. (171° C.). At the closed end 109 of the mold 90 a temperature moderating means such as a cooling plate 120 having cooling passages 121 is provided to prevent full curing of a trailing portion 122 of the second section 118 of tread and the trailing portion 116 of the first section 114 of tread. If desired, the cooling plate 120 may be replaced by an insulating plate or some other means for limiting the heating of the trailing portions 116 and 122 to provide partially cured portions 124 and 126 at the trailing portions of the first section 114 and second section 118 of the tread as shown in FIG. 6. When the second section 118 of the tread is formed in one of the mold cavities 119, the partially cured portion 124 of the first section 114 will be cured and adhered to a leading portion 130 of the second section 118 of the tread. The partially cured portion 124 is preferably relatively thin and has a thickness of from 0.040 to 0.20 inches (1.016 to 5.08 mm).

The mold 90 has a length less than the length of the tread being molded and this is possible because of the molding and adhering of the adjacent sections of tread.

Figure 7:
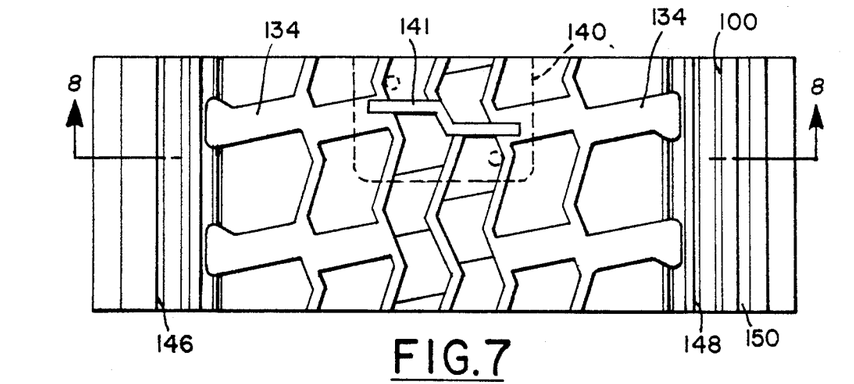
FIG. 7 is a plan view of the tread forming face of the lower mold at the trailing end showing the rib insert for forming the dam groove extending across the longitudinal grooves in the tread.
Figure 8:
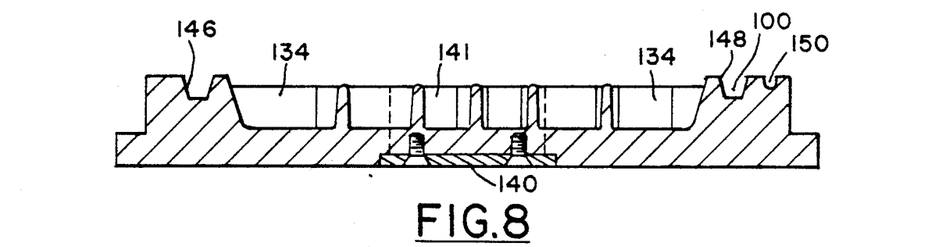
FIG. 8 is a sectional view taken along line 8—8 in FIG. 7.
Figure 9:
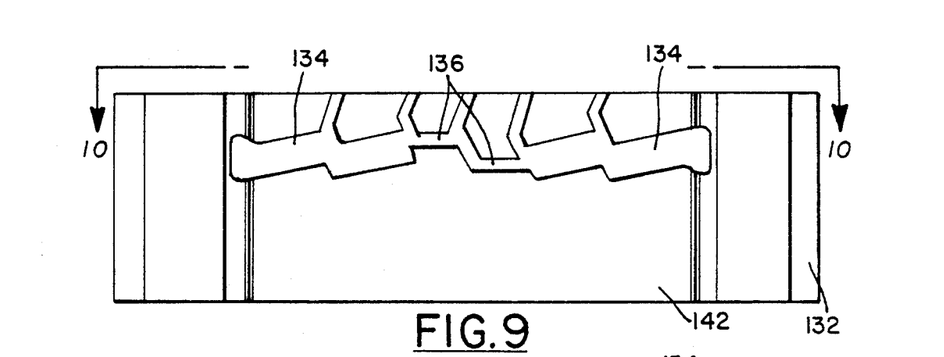
FIG. 9 is a plan view of the clamping tread forming surface of the clamping member for the lower mold showing the dam for preventing flow of injected rubber out the open end of the mold.
Figure 10:
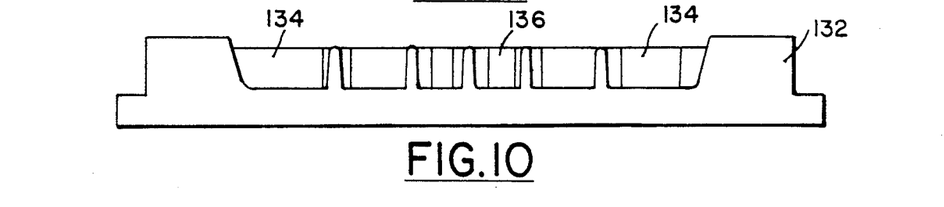
FIG. 10 is an end view taken along line 10—10 in FIG. 9 showing the dam.
Figure 11:
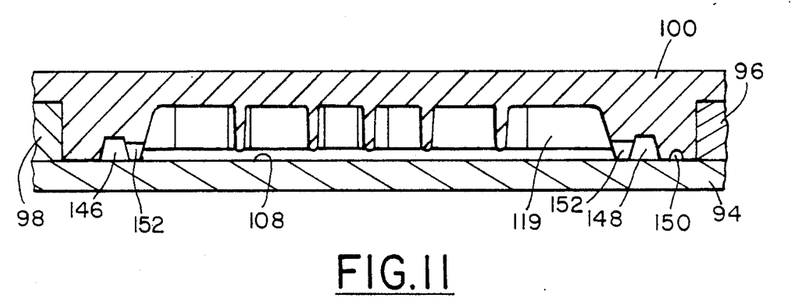
FIG. 11 is a fragmentary sectional view of he upper mold taken along line 11—11 in FIG. 4.

In order to hold the trailing portions 116 and 122 of the cured tread sections 114 and 118 in the open end 110 of the mold 90, clamp members 132 may be provided as shown in FIGS. 4, 5, 6, 9 and 10. Each of the clamp members 132 has ribs 134 conforming to the grooves molded in the trailing portions 116 and 122 of the first and second tread sections 114 and 118. Where the tread configuration has longitudinally continuous grooves, the clamp members 132 must have suitable dam members such as dam ribs 136, shown in FIGS. 9 and 10, for engagement with special dam grooves 138 shown schematically in FIG. 6. The dam grooves 138 are molded in the trailing portions 116 and 122 of the first section 114 and second section 118 of the tread by insert 140 containing a molding dam rib 141 extending across the space between the ribs 134 as shown in FIGS. 7 and 8. Preferably the dam grooves 138 and molding dam rib 141 have dam positions which are in a position generally perpendicular to the side rails 98.

In the above description, shown in FIGS. 7, 8, 9 and 10, the tread mold segments 100 including the clamp members 132 are shown in an inverted position relative to the embodiment shown in FIGS. 4, 5 and 6. These drawings also show the construction of the tread segment assemblies 48' and 52' for the embodiment shown in FIG. 3 in which the mold segments are in the same attitude as the mold segments 100 shown in FIGS. 7 through 10. As stated hereinabove, the features of the cooling plate 120 and clamp members 132, described for the modification of FIGS. 4 through 10, also apply to the embodiment of FIGS. 1, 2 and 3.

Referring to FIG. 6, a position indicating means such as a knob 142 may be molded in the surface of the trailing portions 116 and 122 so that as the adjacent tread sections 114 and 118 are shifted through the open end 110 of the mold 90 the knob 142 may be engaged by a switch 144 mounted on the open end of the mold to locate the trailing portion in position for sealing engagement by the ribs 134 and dam rib 136. An alternative position indicating means is a photoelectric eye 145 positioned at the open end 110 of the mold over an opening in the tread mold segment 100 for responding to an interruption in a light beam reflecting from the upper mold surface 108 covered by the trailing portion 116 of the first tread section 114. A second photoelectric eye (not shown) may be provided to control the speed the tread sections 114 and 118 are pulled out of the mold 90 prior to stopping the movement.

Referring to FIGS. 4, 7, 8 and 11, suitable passages such as feeding grooves 146 may be provided at the sides of the mold segments 100 which have the gates 106. At the opposite sides of the mold segments 100, collection grooves 148 and vacuum grooves 150 may be provided. As shown in dotted lines in FIG. 4, the feeding grooves 146 and collection grooves 148 extend longitudinally of the mold segments 100. Drain notches 152 in communication with the feeding grooves 146 and collection grooves 148 are positioned close to the open end 110 of the mold 90 and next to the surface of the mold cavity space defined by the face of the trailing portion 116 of the cured section 114 of the treads. The drain notches 152, feeding grooves 146 and collection grooves 148 provide space for overflow of the injected uncured rubber of the second section 118 when there is excessive pressure or an excess volume of rubber injected into the mold cavity 119. It has been found that this provision for overflow controls the pressure of the uncured rubber against the face of the trailing portion 116 of the cured tread section 114 so that an even pressure against the face is precisely maintained within desired limits for a satisfactory splice between the trailing portion 116 of the cured first tread section and the leading portion 130 of the uncured second tread section 118. If desired, groove dams 154, shown in FIG. 4 in dotted lines, may be mounted in the feeding grooves 146 and collection grooves 148 between the gates 106 and the open end 110 to make sure there is sufficient space in the feeding grooves and the collection grooves for the overflow at the open end of the mold 90.

Figure 12:
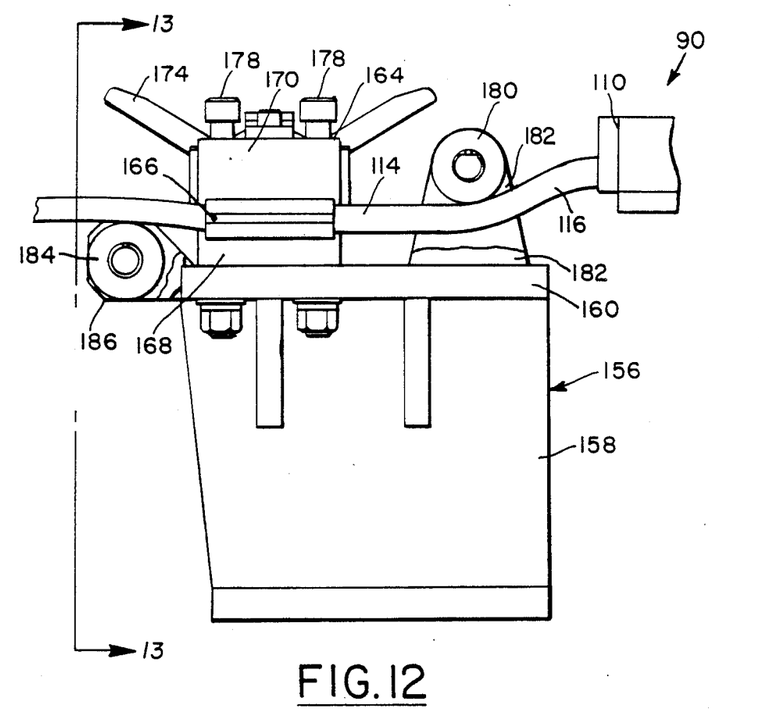
FIG. 12 is a side elevation of the tread clamping fixture taken along line 12—12 in FIG. 4 with parts of the mold and roller supports being broken away illustrating the position of a cured section of the tread in the clamping fixture during injection of the next section.
Figure 13:
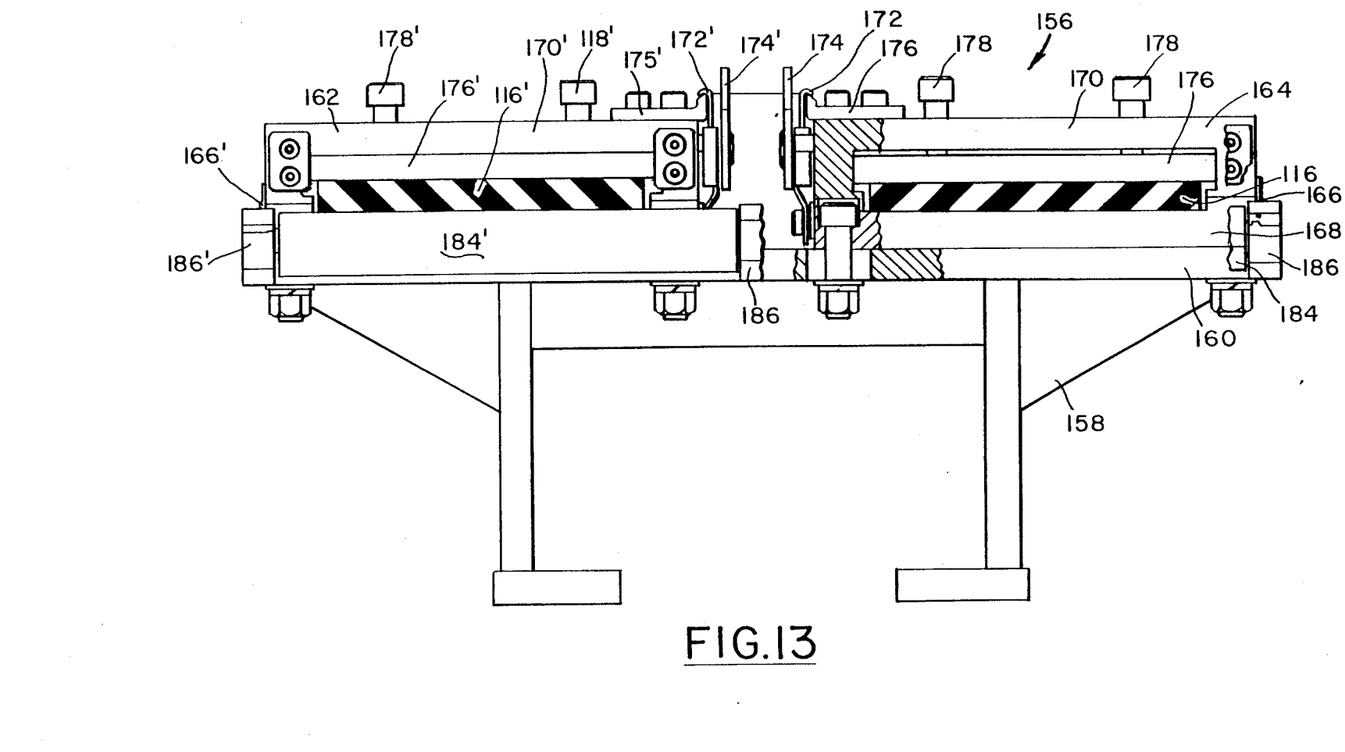
FIG. 13 is an end view of the clamping fixture taken along the line 13—13 in FIG. 12, parts being broken away.

Referring to FIGS. 4, 12 and 13, tread holding apparatus 156 is provided for clamping the trailing portion 116 of the cured first section 114 of tread prior to injection of the uncured rubber for the second section 118 of tread to cooperate with the clamp members 132 in holding the trailing portion in position in the mold 90. Then after the second section 118 is cured and the mold 90 is opened, the holding apparatus 156 will hold the tread and strip it from the molding surfaces. The tread holding apparatus 156 is positioned adjacent the open end 110 of the mold 90 and between the mold and the tread cutters.

The tread holding apparatus 156 has a supporting frame 158 for mounting in a fixed position as on the floor of a tire factory. The frame 158 has a base plate 160 for supporting two clamping assemblies 162 and 164 mounted in side-by-side relationship on the base plate for clamping two trailing end portions 116,116' extending into the mold 90 as shown in FIG. 4. The following description of clamping assembly 164 also applies to clamping assembly 162 except for the position of hinges 166,166' which are at opposite sides of the tread holding apparatus 156. In the drawings, similar parts of the clamping assembly 162 are given the same numerals with a prime symbol.

A lower clamping jaw 168 of the clamping assembly 164 is bolted to the base plate 160 and connected by the hinge 166 to an upper clamping jaw 170. A suitable latch 172 having a handle 174 is mounted on the lower clamping jaw for locking engagement with a latch plate 175 bolted to the upper clamping jaw 170. A pressure plate 176, which may be serrated to grip the tread 116, is adjustably mounted in the upper clamping jaw 170. Cap screws 178 are threaded in the upper clamping jaw 170 for engagement with the pressure plate 176 and for moving the pressure plate toward the lower clamping jaw to accommodate treads of different thicknesses.

Rollers 180 may be rotatably mounted on lugs 182 fastened to the base plate 160 at the upstream end of the tread holding apparatus 156. Rollers 184 may be rotatably mounted on lugs 186 fastened to the base plate 160 at the downstream end of the tread holding apparatus 156. The rollers 180 and 184 position the trailing end 116 of the tread during the clamping operation and guide the tread as it is moved through the tread holding apparatus 156.

In operation of the apparatus shown in FIGS. 4 through 13, the tread sections are injected in a manner similar to that described for the embodiment of FIGS. 1, 2 and 3. In this modification, however, the trailing ends 116 of the first section 114 are clamped in the mold 90 and in the tread holding apparatus 15 to hold the trailing end portion firmly in position in the mold.

Figure 14:
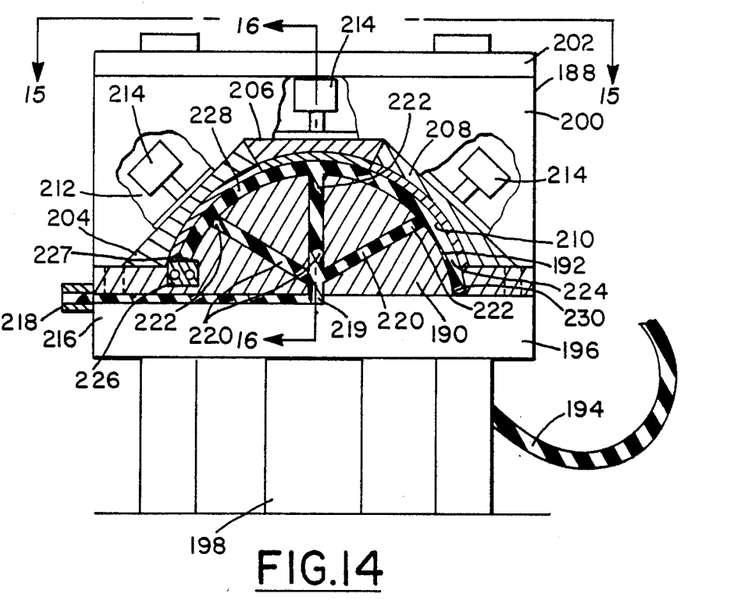
FIG. 14 is a schematic elevation, partly in section, taken along line 14—14 in FIG. 16 of another modification for injection molding preshaped treads.
Figure 15:
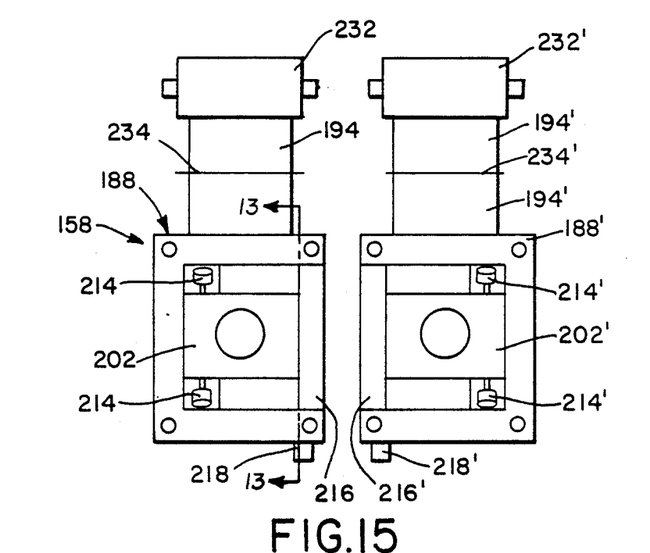
FIG. 15 is a schematic plan view of the modification shown in FIG. 14 taken along line 15—15 in FIG. 14 illustrating the system with the tread cutters and rollers shown schematically.
Figure 16:
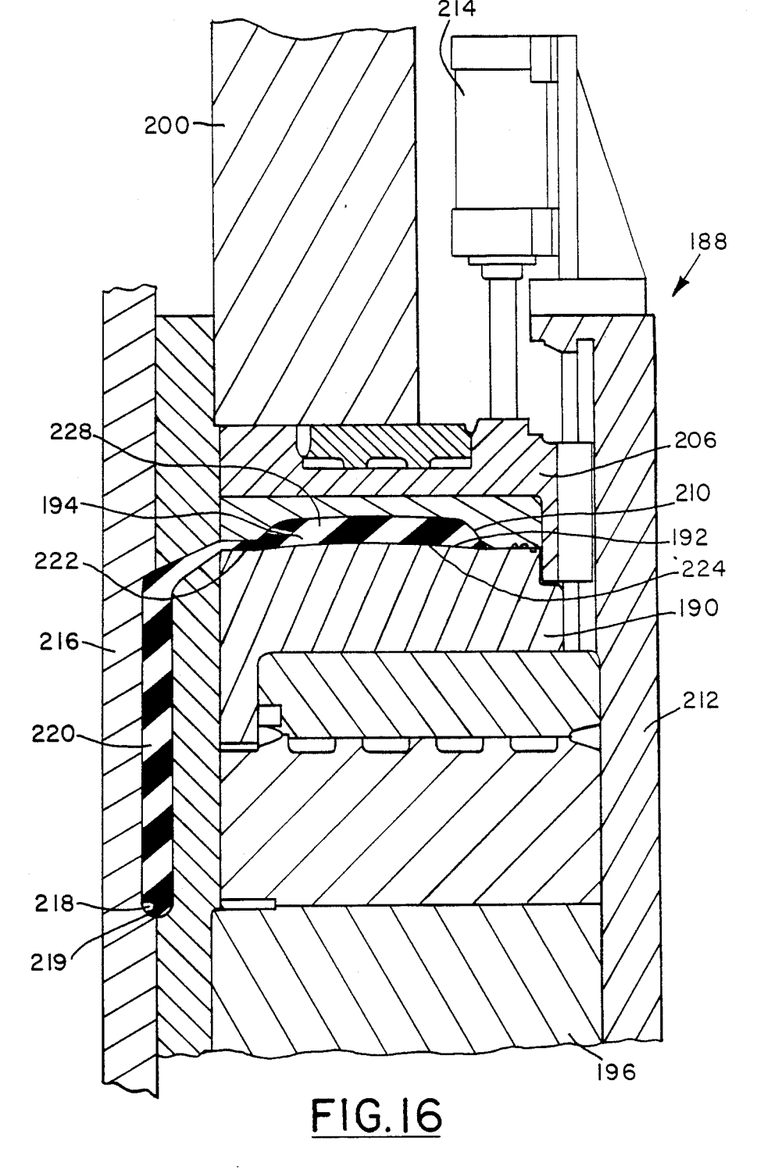
FIG. 16 is a sectional view taken along line 16—16 in FIG. 14.

A further modification is shown in FIGS. 14, 15 and 16 in which a mold 188 has a core 190 with a curved mold surface 192 having a curvature generally the same as a tire on which a tread 194 is applied during retreading or making of a new tire. The core 190 is mounted on a bottom platen 196 of a press 198 for applying pressure to the tread 194 through a pressing plate 200 attached to a top platen 202. It is understood that the pressure may alternatively be provided by the top platen 202 mounted on a press similar to the press 198 of this embodiment. Curved mold segments 204, 206 and 208 having curved tread forming surfaces 210 are slidably mounted on a support plate 212 for radial movement of the mold segments into engagement with the core 190. Piston and cylinder assemblies 214 between the support plate 212 and mold segments 204, 206 and 208 are positioned to retract the mold segments from a closed position in engagement with the core 190 to an open position spaced from the core permitting movement of the molded section of the tread to a position for molding the next section. Preferably the mold segments 204, 206 and 208 are retracted from the molded tread 194 in sequence starting with mold segment 204 to strip the tread from the mold and minimize the stretching of the tread. The mold segments 204, 206 and 208 may also be retracted in a different order but at different times so that at least one of the segments 204, 206 or 208 remains extended.

A cold runner block 216 may be provided adjacent the core 190 and have a cold runner inlet 218 extending through the cold runner block to a central location 219 and radially extending runners 220 in communication with gates 222 opening along one side of a mold cavity 224. A cooling plate 226 may be provided at a closed end 227 of the mold 188 for partially curing the trailing portion of a second section of tread 228 as shown in FIG. 14. A trailing portion of a first section 230 of tread which has been partially cured and is clamped in the open end of the mold is then adhered to a leading end of the second section 228 of tread during curing in a manner similar to that described for the embodiments of FIGS. 1 and 4.

An injection molding machine (not shown) may be positioned to inject uncured rubber into the cold runner inlet 218 while the mold 188 is in the closed position as shown in FIGS. 14, 15 and 16. The injection molding machine may then be moved to a position for injecting uncured rubber into a similar mold 188′ having a cold runner inlet 218′ during the time when the first mold 188 is being opened and the tread section shifted to make room for the next section to be molded. The tread 194 may be wrapped around a roller 232 until a suitable length is produced at which time the tread may be cut by a suitable cutter 234.

Figure 17:
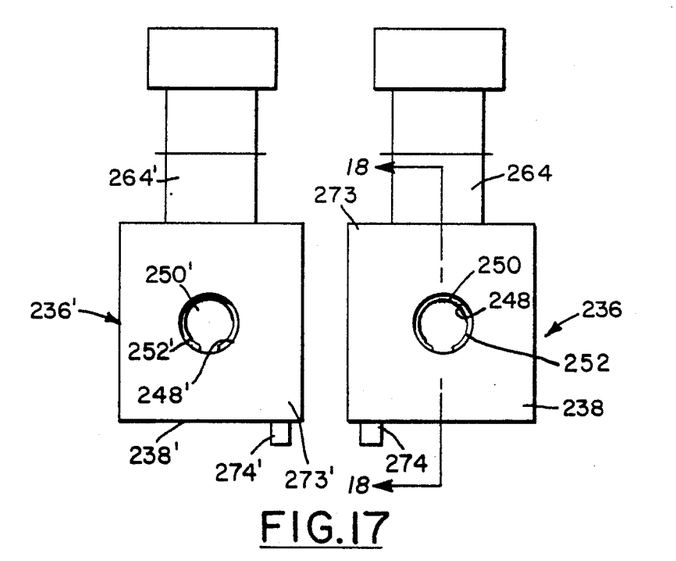
FIG. 17 is a schematic plan view like FIG. 15 of still another modification.
Figure 18:
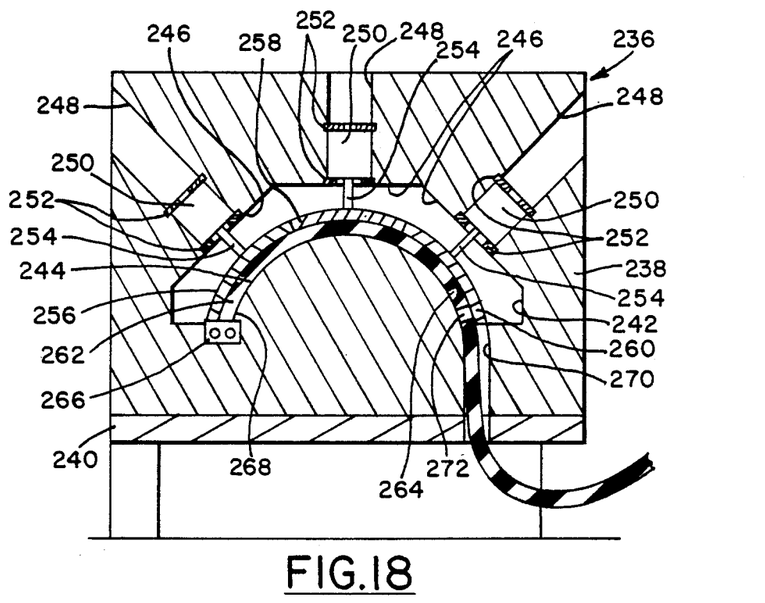
FIG. 18 is a sectional view taken along line 18—18 in FIG. 17.

Referring to FIGS. 17 and 18, a further modification is shown in which a mold 236 of a similar type to that shown in FIGS. 14, 15 and 16 is illustrated. The mold 236 may be of a single block 238 of steel or other suitable material supported on a bottom platen 240. An opening 242 extending through the block 238 is defined by a curved tread forming surface 244 and by outer surfaces 246 spaced from the tread forming surface. Cylindrical openings 248 may also be provided in the block 238 for receiving piston and cylinder assemblies 250 which are mounted in the cylindrical openings as by mounting rings 252 fastened to the surface of the block 238. Piston rods 254 of the piston and cylinder assemblies 250 are connected to curved mold segments 256, 258 and 260 movable into engagement with the curved tread forming surface 244 forming a mold cavity 262 for injection molding of a tread section 264.

A cooling plate 266 is located at a closed end 268 of the mold cavity 262 for limiting the heating and only partially curing the trailing portion of the tread section 264 injected into the mold cavity. A slot 270 is located in the block 238 at an open end 272 of the mold cavity 262 for shifting the cured section of tread to a position where the trailing portion of the cured tread section is located at the closed end and clamped between the curved mold segment 260 and the curved tread forming surface 244 where it may be adhered to the leading end of the next section of tread during curing in a manner similar to that described for the previous embodiments. A cold runner block 273 similar to that shown for the embodiment of FIGS. 14 and 15 having cold runner inlets 274 extending through the cold runner block to a central location and radially extending runners in communication with gates opening along one side of the mold cavity 262 may be provided at one side of the block 238. Likewise, injection molding machines (not shown) may be positioned to inject uncured rubber into the cold runner inlets 274.

The above description which is directed to the mold 236 shown at the right side of FIG. 17 also applies to the mold 236′ at the left side and the prime symbol is used to identify similar parts at the mold 236′ on the left side.

In operation, the piston and cylinder assemblies 250 are actuated to move the mold segments 256, 258 and 260 into engagement with the curved tread forming surface 244 to form the mold cavity 262 into which the uncured rubber is injected. Suitable cooling and heating means such as steam and water passages (not shown) may be provided to heat the platen 240 and block 238 as well as cool the cooling plate 266. Vacuum passages may also be provided, if desired. After the tread section 264 is cured in the mold cavity 262, the piston and cylinder assemblies 250 may be actuated to retract the mold segments 256, 258 and 260 at different times for stripping the tread section from the segments. With this construction, a press is not necessary and the block 238 provides the necessary strength to hold the mold segments 256, 258 and 260 in position at the preferable high pressures of 2000 to 10,000 psi (140.62 to 703.08 kg/cm$^2$) of cavity pressure.

While certain representative embodiments and details have been shown for the purpose of illustrating the invention, it will be apparent to those skilled in the art that various changes and modifications may be made therein without departing from the spirit or scope of the invention.

What is claimed is:

1. A method of injection molding a continuous elongated body of curable fluid molding material by increments in a mold with a mold cavity having a temperature moderating closed end and an open end wherein the distance between said closed end and said open end is less than the length of said elongated body comprising:
   (a) injecting a curable fluid molding material into said mold cavity forming a first section of said elongated body in a first position having a trailing portion abutting said closed end;
   (b) heating said fluid molding material after injection to cure said first section;
   (c) limiting the heating of said trailing portion of said first section at said closed end of said mold cavity to prevent full curing of said trailing portion;
   (d) opening said mold;
   (e) shifting said first section longitudinally from said first position in said mold cavity to a second position with said trailing portion of said first section in said open end of said cavity and the remainder of said first section outside of said mold;
   (f) closing said mold to enclose said mold cavity and clamp said trailing portion of said first section;
   (g) injecting a curable fluid molding material into said mold cavity forming a second section of said elongated body with a leading portion of said second section abutting said trailing portion of said first section and a trailing portion of said second section abutting said closed end of said mold cavity;
   (h) heating said fluid molding material after injection of said second section and said trailing portion of said first section to cure said second section and adhere said trailing portion of said first section to said leading portion of said second section; and
   (i) opening said mold and removing said trailing portion of said first section and said second section of said elongated body from said mold cavity.

2. The method of claim 1 including injecting said curable fluid molding material into said mold cavity along at least one side of said mold cavity.

3. The method of claim 1 wherein said mold has a first mold section and a second mold section for opening and closing said mold including pressing said first mold section and said second mold section together during injection and curing of said fluid molding material.

4. The method of claim 3 wherein said mold cavity comprises a first mold cavity to form a first elongated body and said mold has a second mold cavity located alongside said first mold cavity to form a second elongated body including injecting said curable fluid molding material simultaneously into said first mold cavity and said second mold cavity to form first sections of said first and second elongated bodies, shifting said first sections of said first and second elongated bodies to second positions with trailing portions of said first and second elongated bodies clamped in said mold at said open ends of said first and second mold cavities and injecting said fluid molding material simultaneously into said first mold cavity and said second mold cavity to form second sections of said elongated bodies and adhere leading ends of said second sections to said trailing ends of said first sections.

5. The method of claim 3 wherein said elongated body is a tire tread and said first mold section has a plurality of ribs for molding tire tread grooves in the surface of said first section of said tire tread further comprising positioning said trailing portions of said cured first section of said tire tread in said open end of said mold cavity so that at least some of said tire tread grooves are engaged by some of said ribs during clamping of said trailing portion of said first section whereby said mold cavity will be closed at said open end and a continuous tire tread pattern provided between said first section and said second section of said tire tread.

6. The method of claim 5 wherein said first mold section includes a clamp member at said open end having said ribs for engaging said grooves of said trailing portion of said first section of said tire tread further comprising positioning said trailing portion of said cured first section with said ribs of said clamp member engageable with at least some of said grooves in said trailing portion during clamping of said trailing portion.

7. The method of claim 5 further comprising holding said trailing portions of said cured first section of said tire tread at a position adjacent said open end of said mold during injection and curing of said second section of said tire tread for resisting movement of said trailing portion out of said mold at said open end and including holding said trailing portion upon opening of said mold to strip said second section of said tire tread and said trailing portion of said first section of said tire tread from said ribs of said first mold section and then releasing said trailing portion of said first section from said position adjacent said open end of said mold cavity for removing said tire tread from said mold cavity.

8. The method of claim 5 wherein at least some of said grooves molded in said surface of said first section of said tire tread extend longitudinally of said tire tread further comprising molding dam grooves in said surface between said longitudinally extending grooves in said trailing portions of said first section of said tire tread and then filling said dam grooves with corresponding dam ribs on said first mold section at said open end whereby said injected material is prevented from passing through said longitudinally extending grooves of said tire tread at said open end.

9. The method of claim 1 including the step of overflowing said curable fluid molding material injected into said mold cavity into overflow spaces in said mold adjacent said open end of said mold cavity to evenly distribute the pressure of said fluid molding material against said trailing portion of said first section.

10. The method of claim 1 wherein said mold has longitudinally curved molding surfaces forming said mold cavity with one of said molding surfaces being generally concave on radially movable mold segments at longitudinally spaced positions along said mold and the other of said molding surfaces being generally convex on a mating core section including the steps of closing said mold by moving said mold segments into engagement with said mating core section prior to injection molding of said first section and said second section of said elongated body, and retracting said mold segments to open said mold.

11. The method of claim 10 further comprising retracting said mold segments at different times to strip said first section and said second section from said mold after curing.

12. The method of claim 10 wherein said mold is disposed in a press having a first press member for engaging said mold segments and a second press member for supporting said mating core section further comprising the steps of moving said first press member and said second press member together after said mold segments are moved into engagement with said mating core section for containing said injected fluid molding material in said mold cavity under pressure and moving said first press member and said second press member apart after injection of said fluid molding material so that said mold segments can be retracted.

13. The method of claim 10 wherein said mold is contained in a block member having an opening for said curved molding surfaces further comprising moving said mold segments from a position spaced from said mating core section in said opening to a position in engagement with said mating core section for injection molding of said first section and said second section of said elongated body and retracting said mold segments from said mating core section for shifting said first section and said second section out of said mold cavity.

14. The method of claim 1 wherein said fluid molding material is injected into said mold cavity by an injection molding machine further comprising the step of injecting fluid molding material from said injection molding machine into a mold cavity of a second mold during opening of said first-mentioned mold and shifting said first section longitudinally from said first position in said mold cavity to said second position and closing said firstmentioned mold to clamp said trailing portion of said first section.

* * * * *